(12) United States Patent
Bennett et al.

(10) Patent No.: US 8,997,875 B2
(45) Date of Patent: Apr. 7, 2015

(54) RESERVE BATTERY TO PROVIDE POWER FOR SUBSEA APPLICATIONS

(71) Applicants: EaglePicher Technologies, LLC, Joplin, MO (US); Cameron International Corporation, Houston, TX (US)

(72) Inventors: John Bennett, Joplin, MO (US); Greg Miller, Diamond, MO (US); Mike Parrot, Joplin, MO (US); Jim Ferraro, Baxter Springs, KS (US); Greg Kirk, Oronogo, MO (US); Dharmesh Bhakta, Joplin, MO (US); Donald Scott Coonrod, Katy, TX (US)

(73) Assignees: EaglePicher Technologies, LLC, Joplin, MO (US); Cameron International Corporation, Houston, TX (US)

( * ) Notice: Subject to any disclaimer, the term of this patent is extended or adjusted under 35 U.S.C. 154(b) by 60 days.

(21) Appl. No.: 13/735,480

(22) Filed: Jan. 7, 2013

(65) Prior Publication Data
US 2013/0292130 A1    Nov. 7, 2013

Related U.S. Application Data

(60) Provisional application No. 61/641,546, filed on May 2, 2012.

(51) Int. Cl.
*E21B 33/035* (2006.01)
*E21B 41/00* (2006.01)
(Continued)

(52) U.S. Cl.
CPC ............. *E21B 41/0007* (2013.01); *H01M 2/30* (2013.01); *H01M 6/36* (2013.01); *H01M 6/425* (2013.01); *H01M 6/38* (2013.01)

(58) Field of Classification Search
CPC ..... E21B 33/0355; E21B 33/064; H01M 6/425
USPC .......... 166/351, 338, 363, 368, 373; 251/1.1–1.3; 340/855.8, 693.2
See application file for complete search history.

(56) References Cited

U.S. PATENT DOCUMENTS 3,641,539 A * 2/1972 Lesher ........................ 340/549
3,946,806 A    3/1976 Meynier, III
(Continued)

FOREIGN PATENT DOCUMENTS

| WO | 2011/119110 A1 | 9/2011 |
| WO | WO 2011/119110 A1 | 9/2011 |
| WO | WO 2012/047291 | 4/2012 |

OTHER PUBLICATIONS

Apr. 22, 2013 Search Report and Written Opinion issued in International Application No. PCT/US2012/069184.
(Continued)

*Primary Examiner* — Matthew Buck
(74) *Attorney, Agent, or Firm* — Sutherland Asbill & Brennan LLP

(57) ABSTRACT

A subsea system includes an electrically powered control system for controlling the subsea system and a replaceable reserve battery electrically coupled to the control system to provide backup and/or supplemental power to the control system when the reserve battery is activated. The reserve battery is provided in a housing having a first coupling, the subsea system includes a second coupling, and the first and second couplings are detachably connectable to each other and include electrical connections so that the reserve battery is replaceable while the subsea system remains below the sea-surface.

19 Claims, 13 Drawing Sheets

(51) Int. Cl.
  *H01M 2/30* (2006.01)
  *H01M 6/36* (2006.01)
  *H01M 6/42* (2006.01)
  *H01M 6/38* (2006.01)

(56) References Cited

U.S. PATENT DOCUMENTS

| | | | |
|---|---|---|---|
| 3,994,472 A | 11/1976 | Williams | |
| 4,007,904 A | 2/1977 | Jones | |
| 4,367,794 A * | 1/1983 | Bednar et al. | 166/66.5 |
| 4,840,346 A | 6/1989 | Adnyana et al. | |
| 5,175,708 A * | 12/1992 | Dumestre, III | 367/3 |
| 6,318,482 B1 | 11/2001 | Fidtje | |
| 6,595,487 B2 * | 7/2003 | Johansen et al. | 251/129.04 |
| 6,719,042 B2 | 4/2004 | Johnson et al. | |
| 8,353,350 B2 * | 1/2013 | Overfield | 166/336 |
| 2002/0023532 A1 * | 2/2002 | Porter | 91/471 |
| 2005/0253458 A1 * | 11/2005 | Omae et al. | 307/10.1 |
| 2012/0088134 A1 * | 4/2012 | Wood et al. | 429/90 |
| 2012/0273211 A1 * | 11/2012 | Choudhury et al. | 166/336 |
| 2012/0309241 A1 | 12/2012 | Yeo | |
| 2013/0193763 A1 * | 8/2013 | Zhao et al. | 307/65 |

OTHER PUBLICATIONS

Nov. 4, 2014 International Preliminary Report on Patentability and Written Opinion issued in International Patent Application No. PCT/US2012/069184.

* cited by examiner

TECHNICAL SPECIFICATIONS

Electrical Performance:
    Number of Circuits (Pins):    4
    Maximum Operational Current:    60 Amps per Pin
    Maximum Operational Voltage:    1.7 kVAC /1.0 kVDC   ($U_o$ = 1.0 kVAC)
    Insulation Resistance:    $\geq$ 10 G$\Omega$ @ 1.0 kVDC
    Leakage Current:    $\leq$ (test voltage)/10G$\Omega$ per Circuit
    High Voltage Breakdown:    Breakdown $\geq$ 8*$U_o$ (8.0 kVAC)

Mechanical Performance:
    Design Life:    25 Years
    Max Operational Depth:    10,000 ft [3,000 m]
    Max Operational Pressure:    4,350 psi [300 Bar]
    Qualification Pressure:    6,525 psi [450 Bar]
    Design Temperature:    -13°F to 131°F [-25°C to +55°C]
    Operational Temperature:    +23°F to +104°F [-5°C to +40°C]
    Storage Temperature:    -13°F to +122°F [-25°C to +50°C]

FIG. 12

RESERVE BATTERY TO PROVIDE POWER FOR SUBSEA APPLICATIONS

This nonprovisional application claims the benefit of U.S. Provisional Application No. 61/641,546, filed May 2, 2012.

BACKGROUND

This disclosure relates to the use of a reserve battery to provide power for a subsea electrical power function such as in subsea oil and drilling applications where electrical power is needed for many purposes such as powering emergency blowout preventers, point of load electrical power distribution, hybrid power systems, supplemental power, critical system backup, etc. The invention is applicable to any subsea electrical power function requiring the use of a battery that may degrade over time, thus making it advantageous to use a reserve battery, which does not degrade until activation.

Over time, primary batteries degrade causing a decrease in the batteries' ability to hold a charge and to deliver the charge to a load. Due to the primary battery's state of activation, the battery will lose efficacy as the battery ages. Similarly, rechargeable batteries degrade over time. While rechargeable batteries have the ability to be recharged, these batteries lose their ability to hold the same amount of original charge as the battery ages and/or is used. Further, rechargeable batteries require knowledge that the battery needs to be recharged as well as the time/ability to recharge the battery.

Due to the harsh environments encountered in subsea (including deepwater) applications such as salt water and high external pressure, subsea critical power applications require an electrical power source capable of ultrahigh reliability and ultralow maintenance and ease of remote replacement without bringing the device to the surface. During critical power needs, for example the action of enabling or disabling flow, reserve batteries offer an ultrahigh reliable solution for subsea electrical power applications and are proven in high reliability applications such as guided munitions, torpedoes and sonobuoys dating back to the 1940s. In order to enable battery reliability, low maintenance and ease of remote replacement, typical reserve batteries require unique alterations.

In view of the above, it is desirable to provide an electrical power source for critical subsea applications utilizing a reserve battery that is easily and remotely replaceable. Reserve batteries are primary batteries which are inert until the battery is activated and used. More specifically, the active chemical components of a reserve battery are inactive until such time as the battery is needed, thus facilitating long storage life. Thus, reserve batteries are useful for applications requiring extended storage time because they avoid deterioration of the active materials during storage and eliminate the loss of capacity due to self discharge. Reserve batteries can be stored for 10 or more years and still provide full power when required.

It is thus desirable to provide a reserve battery to a subsea power application so as to provide a reservoir of reserve power, for example, to control the flow of oil/gas on an oil/gas rig. Specifically, there is a need to provide a battery that does not deteriorate when stored for long time periods so that the battery will be immediately ready for use in critical situations.

SUMMARY

It would be advantageous to provide an apparatus and method for providing power from a reserve battery to enable control of the flow on an oil/gas rig, for example. Specifically, it would be advantageous to provide a replaceable reserve battery electrically connected to a control system of an oil/gas apparatus that powers the control system when the reserve battery is activated. Thus, the reserve battery can be activated during critical situations when the normal power supply cannot supply adequate power to the oil/gas apparatus. Furthermore, because the reserve battery is a single use battery, it would be advantageous to provide a reserve battery that is adapted to be easily replaced in its environment of use, which is a high-pressure, harsh subsea environment.

In accordance with one aspect of the invention, a subsea system includes a control system for controlling the subsea system and a reserve battery. The reserve battery is electrically coupled to the control system to power the control system when the reserve battery is activated. Further, the reserve battery is replaceably attached to a remainder of the subsea system. Thus, the reserve battery includes a first coupling that is detachably attachable to a second coupling provided in the subsea system. The couplings include electrical connections such that power generated by the reserve battery can be conveyed to the subsea system when the reserve battery is activated. The couplings also may include electrical connections so that control signals can be exchanged between the reserve battery and the subsea system.

In some embodiments, the subsea system is a blowout preventer for sealing a pipe of an oil rig. In some embodiments, the blowout preventer includes a housing including a bore therethrough for receiving the pipe, a pipe sealing device, and an actuator. The pipe sealing device is movable within the housing along a first direction toward a pipe-sealing position. The actuator is coupled to the pipe sealing device to move the pipe sealing device within the housing. The control system controls the actuator to move the pipe sealing device from a stored position to the pipe-sealing position at which the pipe sealing device seals the pipe.

In some embodiments, the reserve battery is a lithium alloy/iron disulfide thermal battery.

In some embodiments, the reserve battery is a molten salt high temperature battery.

In some embodiments, the reserve battery is a silver zinc battery.

In some embodiments, the reserve battery is a lithium/oxyhalide battery.

In some embodiments, the reserve battery includes an electrically-activated activator.

In some embodiments, the reserve battery includes a mechanically-activated activator.

In some embodiments, the mechanically-activated activator is a striker pin.

In some embodiments, a high pressure, thick-walled container is integral to the reserve battery.

In some embodiments, the high pressure, thick-walled container integral to the reserve battery is detachable from and re-attachable to the control system by wet-mate or dry-mate connectors via a remotely operated vehicle.

In some embodiments, the blowout preventer further includes a primary battery electrically coupled to the control system. The reserve battery is a backup battery connected to the primary battery such that the reserve battery is not able to support power requirements except when called upon to power the blowout preventer.

In some embodiments, the subsea system is at least one of a point of load electrical power distribution, a hybrid power system, and a critical system.

In some embodiments, the subsea system is disposed on a seafloor.

In accordance with another aspect of the invention, a method of providing power to a subsea system having a control system for controlling the subsea system, includes detachably electrically coupling a reserve battery to the subsea system to power the control system when the reserve battery is activated, wherein the reserve battery and the subsea system having mating couplings that include electrical connectors.

BRIEF DESCRIPTION OF THE DRAWINGS

Various exemplary embodiments of subsea applications (e.g., a blowout preventer) and method for providing a reserve battery to subsea applications so as to, for example, prevent a blowout of oil/gas on an oil/gas rig, will be described in detail with reference to the following drawings in which:

FIG. 12 is a chart of the technical specifications of a connector that can be used with the replaceable reserve battery;

DETAILED DESCRIPTION OF EMBODIMENTS

Exemplary embodiments are provided of apparatuses and methods for using a reserve battery to provide backup or supplemental power for subsea applications. The invention is applicable to numerous subsea applications including, for example, point of load electrical power distribution, hybrid power systems, and any critical system back-up such as, for example, for powering (or providing back-up power to) emergency blowout preventers. Thus, although the invention will be described as used with an emergency blowout preventer in which a pipe is sealed so as to prevent a blowout of oil/gas, this is just one example. The invention is applicable to various emergency situations, long term storage situations, and situations requiring reliability of the battery. The following example application will be discussed with respect to shear RAM blowout preventers, pipe RAM blowout preventers, and annular-type blowout preventers. However, the application is not limited to the use of these blowout preventer types but also includes any other blowout preventer type that utilizes a battery. Further, the use of reserve batteries in subsea applications is not limited to blowout preventers. Instead, blowout preventers, as discussed below, are used to illustrate how a reserve battery can provide power to a subsea application.

Figure 1:
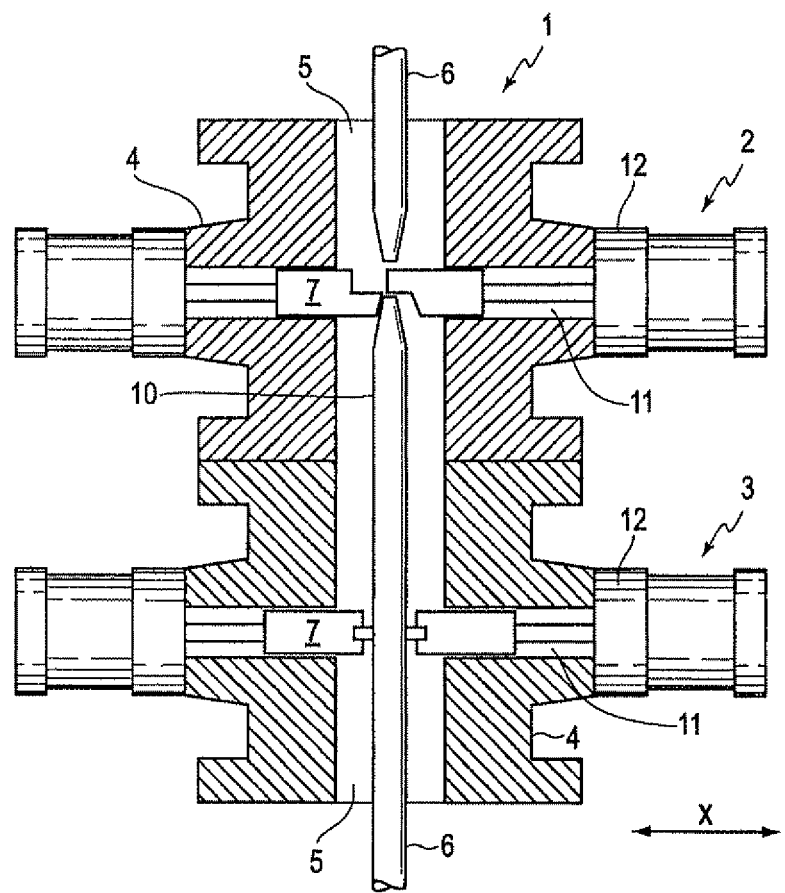
FIG. 1 is a cross-sectional view of an exemplary embodiment in which the invention is applied to a RAM-type blowout preventer in a pipe-sealing position.
Figure 2:
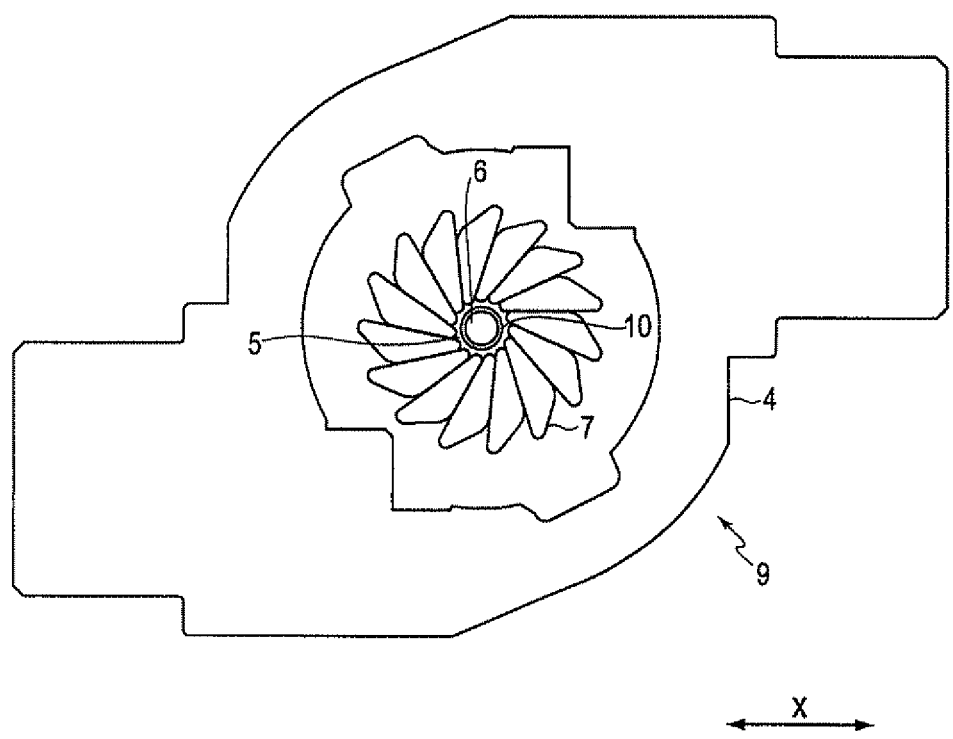
FIG. 2 is top view of an exemplary embodiment in which the invention is applied to an annular-type blowout preventer in a pipe-sealing position.

FIG. 1 illustrates a cross-sectional view of a RAM-type blowout preventer 1. The RAM-type blowout preventer 1 may include, for example, a shear RAM blowout preventer 2 and/or a pipe RAM blowout preventer 3. FIG. 2 illustrates a top view of an annular-type blowout preventer 9. The shear RAM blowout preventer 2, the pipe RAM blowout preventer 3, and the annular-type blowout preventer 9 include the following features, as discussed below.

The blowout preventers 2, 3, 9 include a housing 4 through which a bore 5 is disposed. The bore 5 may be annular so as to receive a pipe 6 from an oil/gas rig (not shown). The blowout preventers 2, 3, 9 also include a pipe sealing device 7. The pipe sealing device 7 is movable within the housing 4 along a longitudinal direction X (for the shear RAM blowout preventer 2 and the pipe RAM blowout preventer 3) and in the longitudinal direction X while also rotating about the axis of the pipe (for the annular-type blowout preventer 9). In the shear RAM blowout preventer 2 and the pipe RAM blowout preventer 3, the pipe sealing device 7 moves in the longitudinal direction X such that the pipe sealing device 7 comes into contact with the pipe 6. Alternatively, the pipe sealing device 7 of the annular-type blowout preventer 9 rotates while also moving in the longitudinal direction such that the pipe sealing device 7 comes into contact with the pipe 6.

Figure 4:
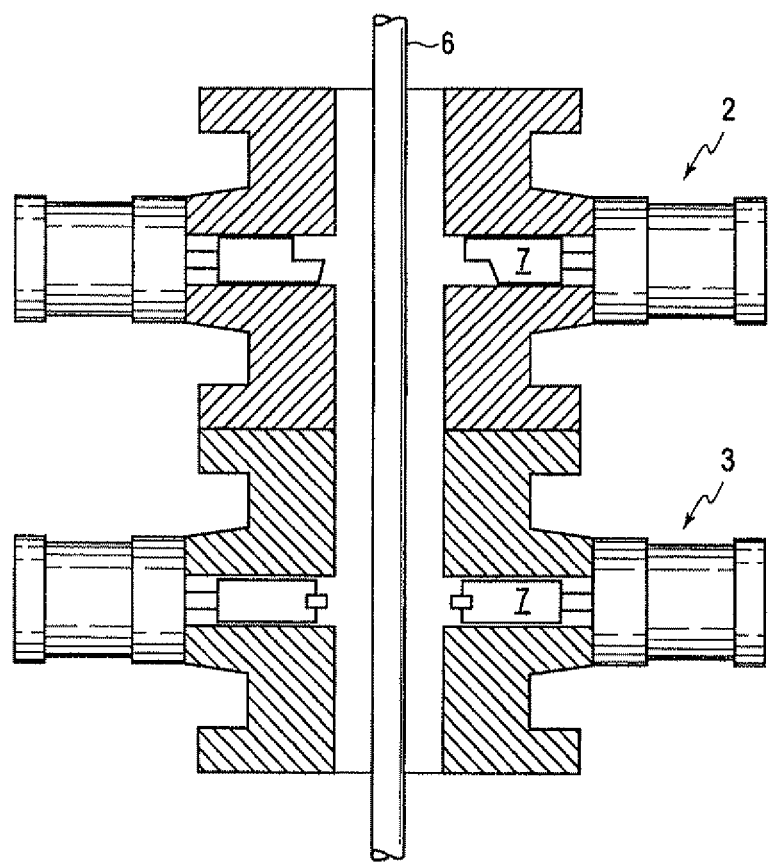
FIG. 4 is a cross-sectional view of FIG. 1 illustrating the RAM-type blowout preventer in a stored position.
Figure 5:
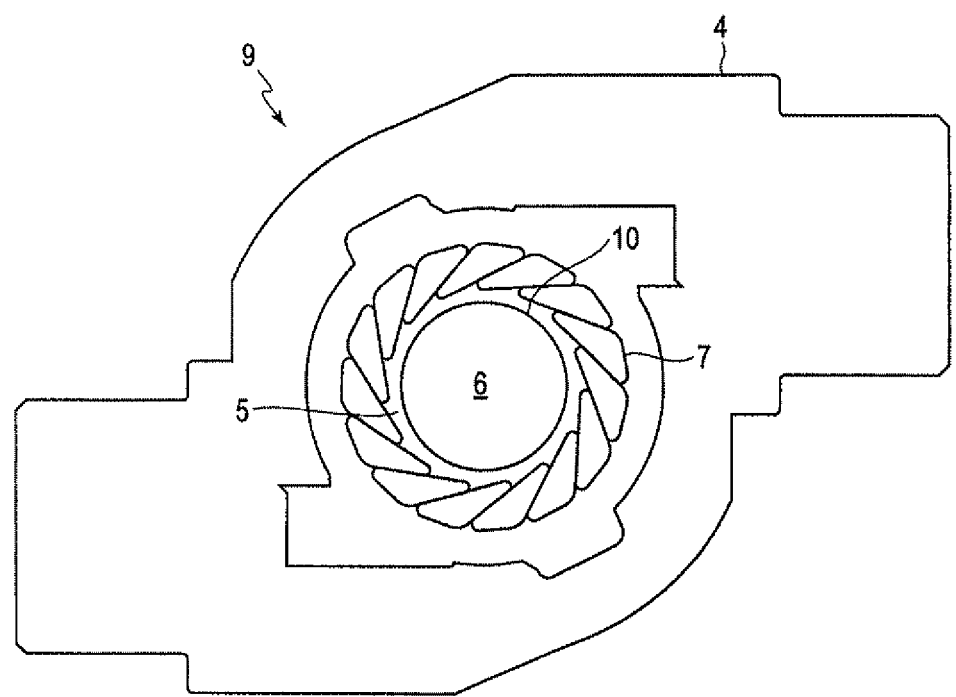
FIG. 5 is a top view of FIG. 2 illustrating the annular-type blowout preventer in a stored position.

As illustrated in FIGS. 4 and 5, the pipe sealing device 7 can be disposed in a stored position such that the pipe sealing device 7 is not in contact with the pipe 6. In this stored position, the blowout preventers 2, 3, 9 are not being utilized to seal the pipe 6 or any of the areas surrounding the pipe 6. FIGS. 1 and 2, however, illustrate the pipe sealing device 7 in the pipe sealing position. In the pipe sealing position, the pipe sealing device 7 of the pipe RAM blowout preventer 3 contacts an outer surface 10 of the pipe 6 so as to restrict the flow of oil/gas in the annulus surrounding the pipe 6. In the pipe sealing position, the pipe sealing device 7 of the shear RAM blowout preventer 2 cuts through the pipe 6 with hardened steel shears so as to close off the oil/gas well (not shown). In the pipe sealing position, the pipe sealing device 7 of the annular-type blowout preventer 9 contacts the outer surface 10 of the pipe so as to seal the annulus surrounding the pipe 6. Commonly, more than one blowout preventer is disposed around the pipe 6 of an oil/gas well (not shown) so as to ensure the prevention of an oil/gas spill. For more details on blowout preventers, see, for example, U.S. Pat. No. 6,719,042, U.S. Pat. No. 4,367,794, U.S. Pat. No. 3,946,806, U.S. Pat. No. 4,007,904, and U.S. Pat. No. 6,318,482, the disclosures of which are herein incorporated by reference in their entireties.

For each of the blowout preventers 2, 3, 9, an actuator 11 and a control system 12 is provided. The control system 12 controls the actuator 11 to move the pipe sealing device 7 from the stored position to the pipe sealing position. The control system 12 is powered by a reserve battery 13 that is electrically coupled to the control system 12. When activated, the reserve battery 13 can power the control system and the actuator 11 for a predetermined period of time dependent on the number of electrochemical cells provided in the reserve battery. When the reserve battery 13 is not activated, the reserve battery 13 remains inert and thus does not degrade over an extended period of non-use that can be more than a decade.

If multiple blowout preventers are disposed around the pipe 6, a single control system or multiple control systems may be utilized to control the blowout preventers. If multiple control systems are utilized, a single reserve battery or a reserve battery coupled to each control system may be utilized.

The reserve battery 13 can be, for example, a lithium alloy/iron disulfide thermal battery, a molten salt high temperature battery (also called a thermal battery), a silver zinc battery, or a lithium/oxyhalide battery. The reserve battery 13 is not limited to these chemistries. Instead, the reserve battery 13 can be any electrochemical configuration that allows for the segregation of the active chemicals of the cell such that activation of the battery is required before the battery becomes functional. One example of a reserve battery can be found in U.S. Pat. No. 7,504,177, the disclosure of which is herein incorporated by reference in its entirety.

The reserve battery 13 is activated by an external input that causes the electrolyte, which is segregated from the other electrochemical components of the reserve battery 13, to be released. Upon release of the electrolyte and contact with the other electrochemical components of the reserve battery 13, the energy of the reserve battery 13 is available for use by the control system 12. Because the reserve battery 13 is not activated until needed, the reserve battery 13 can be utilized in an emergency capacity such as powering the control system of the blowout preventers 2, 3, 9.

The external input necessary to activate the reserve battery 13 can be, for example, a short electrical pulse/trigger via an electrically-activated activator (not shown) or a mechanical input via a mechanically-activated activator (not shown). The mechanically-activated activator can be, for example, a striker pin. When the reserve battery is a molten salt high temperature thermal battery, for example, the reserve battery is activated by igniting a pyrotechnic heat source using either the electrically-activated or the mechanically-activated activator.

Figure 3:
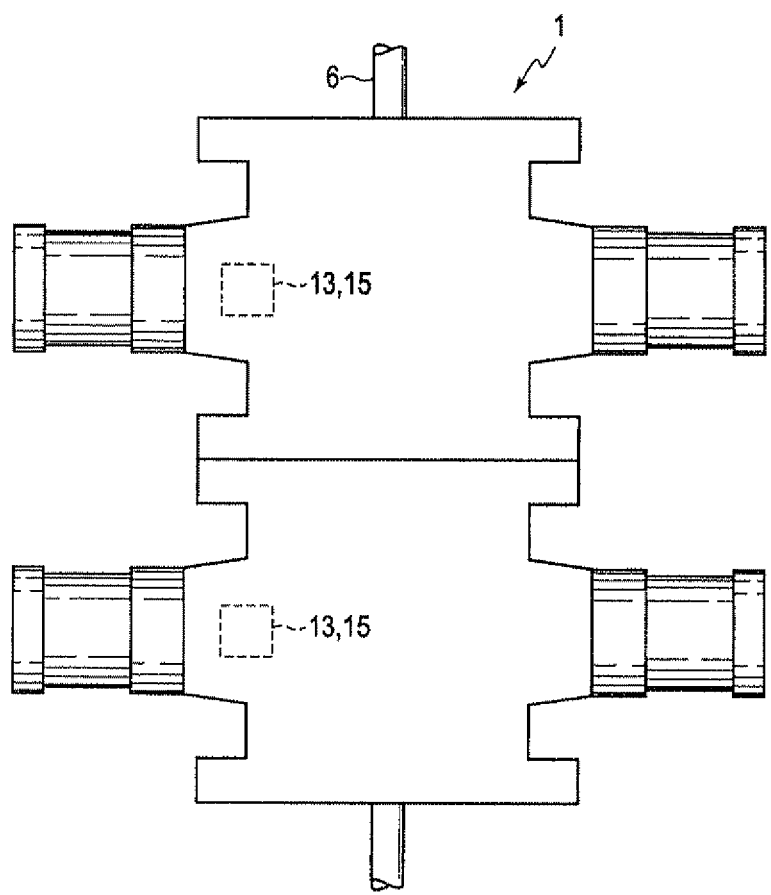
FIG. 3 is a side view of the blowout preventer of FIG. 1.
Figure 8:
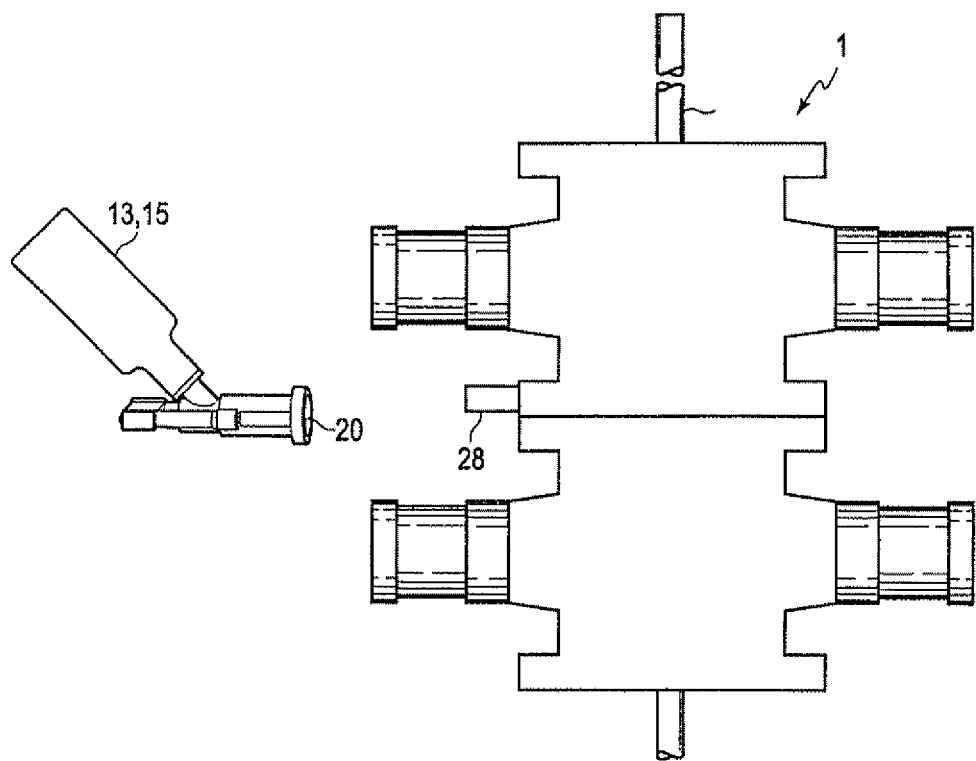
FIG. 8 is a side view of the blowout preventer of FIG. 3 with the reserve battery detached from the blowout preventer.

Due to the pressure differences in deep-sea applications, it is preferable to dispose the reserve battery 13 in a high-pressure-resistant container 15. The container 15 can be a relatively thick container capable of withstanding the high ocean pressures at drilling depths or a pressure compensated container to match the internal pressure with the external seawater pressure. The thickness of the container walls will depend on the material selected for the container and the environment in which the container will be used, and the material of the container wall can be, for example, stainless steel 316L, super duplex alloy, ceramic, titanium or other material components that are able survive high pressure and ocean environments. As illustrated in FIG. 3, the container 15 can be disposed external to the blowout preventers 2, 3, 9; however, the container is not limited to this configuration. The container 15 can also be disposed within the confines of the blowout preventers 2, 3, 9. When the container 15 is external to the blowout preventers 2, 3, 9, it is preferable that the container is detachable from (as illustrated in FIG. 8) and attachable to (as illustrated in FIG. 3) the blowout preventers 2, 3, 9, for example, via a remotely operated vehicle (ROV) (not shown). It is preferable to make the reserve battery detachable/attachable (that is, replaceable) so that the reserve battery can be replaced at the subsea location (for example, on the ocean floor). Thus, when the reserve battery is used in a subsea application that will continue to operate even after the reserve battery has been activated, it will be necessary to replace the spent reserve battery with a new one after the old (spent) battery has been activated. Thus, making the reserve battery easily replaceable will avoid the need to remove the entire system powered by the battery from the subsea location simply to replace the reserve battery. Therefore, in order to make the reserve battery easily replaceable, one or more connectors are provided between the reserve battery and the undersea application (e.g., the blowout preventers 2, 3, 9), with the connector(s) including high pressure electrical feedthroughs and connectors.

Figure 6:
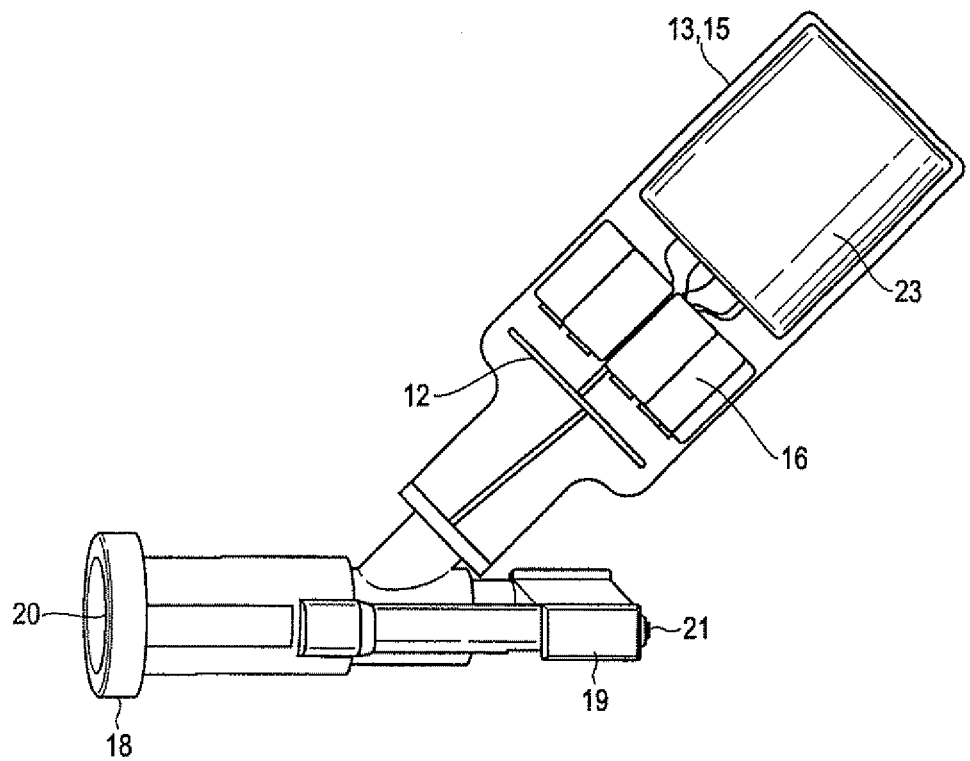
FIG. 6 is an enlarged view of an exemplary embodiment of the invention illustrating a replaceable reserve battery with a single battery set connected to the control system (also in the replaceable portion)
Figure 7:
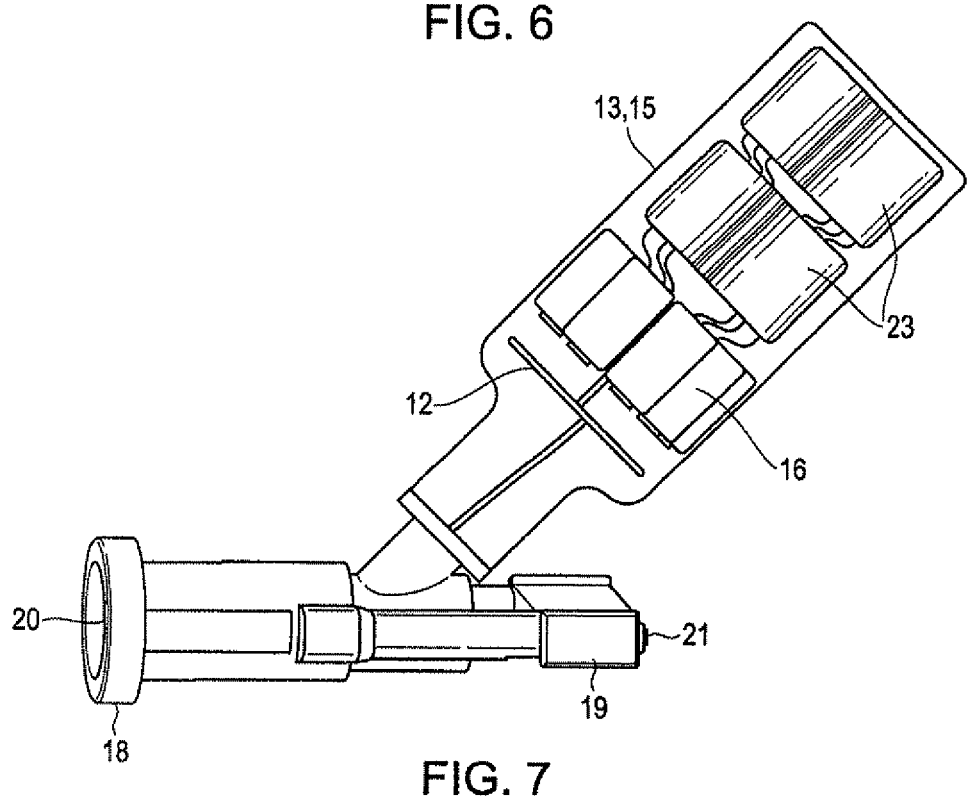
FIG. 7 is an enlarged view of an exemplary embodiment of the invention illustrating a replaceable reserve battery with at least two battery sets connected to the control system (also in the replaceable portion)

FIGS. 6 and 7 illustrate the container 15 with a single battery cell 23 (FIG. 6) or multiple battery cells 23 (FIG. 7) disposed therein. Different systems may require the output of power to last longer depending on their use. Configuring the container to allow for the use of multiple battery cells 23, allows for the variation in energy output. Specifically, multiple battery cells 23 will typically output a required current for a longer period of time.

The container 15 includes the reserve battery cell(s) 23 as well as capacitors or other energy storage devices 16 electrically connected to the battery cell(s). In the embodiments illustrated in FIGS. 6 and 7, the control system 12 for the blowout preventers 2, 3, 9 (or other subsea application to be controlled) is disposed within the container 15. However, the invention is not limited to this configuration. Specifically, the control system 12 may also be located within the blowout preventers 2, 3, 9 (or other subsea application to be controlled), as illustrated in FIGS. 1 and 2.

A first end 18 of the container 15 includes a mechanical and electrical coupling 20 that, when attached to a mating coupling 28 on the blowout preventers 2, 3, 9, electrically and physically connects the container 15 to the blowout preventers 2, 3, 9. The second end 19 of the container 15 includes a ROV attachment portion 21 (a handle) that, when attached to (held by) a mating portion (robotic gripper) on the ROV (not shown), allows the ROV to detach or attach the container 15 from/to the blowout preventers 2, 3, 9.

Figure 9:
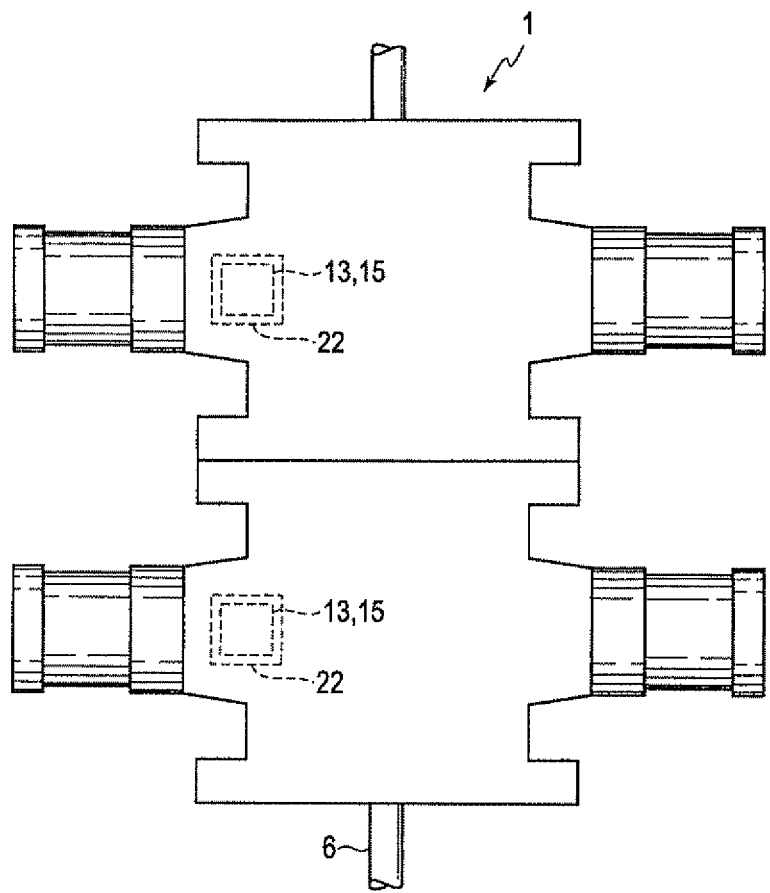
FIG. 9 is a side view of the blowout preventer of FIG. 3 with a primary battery electrically coupled to the control system and the reserve battery connected to the primary battery.

FIG. 9 illustrates an embodiment in which the reserve battery 13 is electrically connected to a primary battery 22 such that the reserve battery 13 is used only as a backup to the primary battery 22. In this embodiment, the primary battery 22, not the reserve battery 13, is directly electrically connected to the control system 12. The control system is thus powered by the primary battery 22. In situations where the primary battery 22 is drained, the reserve battery can be utilized as a backup battery. In particular, primary batteries do not require activation prior to use. Instead, the primary battery 22 has energy available to be used upon production of the battery. Thus, primary batteries are susceptible to degradation and over time may lose their ability to deliver current.

By electrically coupling a reserve battery 13 to the primary battery 22, the control system is provided with a backup battery should the primary battery 22 fail. Thus, if the primary battery degrades over time, the reserve battery 13, which will not activate until needed, will be available should the primary battery 22 fail to provide the requisite current to the control system 12.

Figure 10:
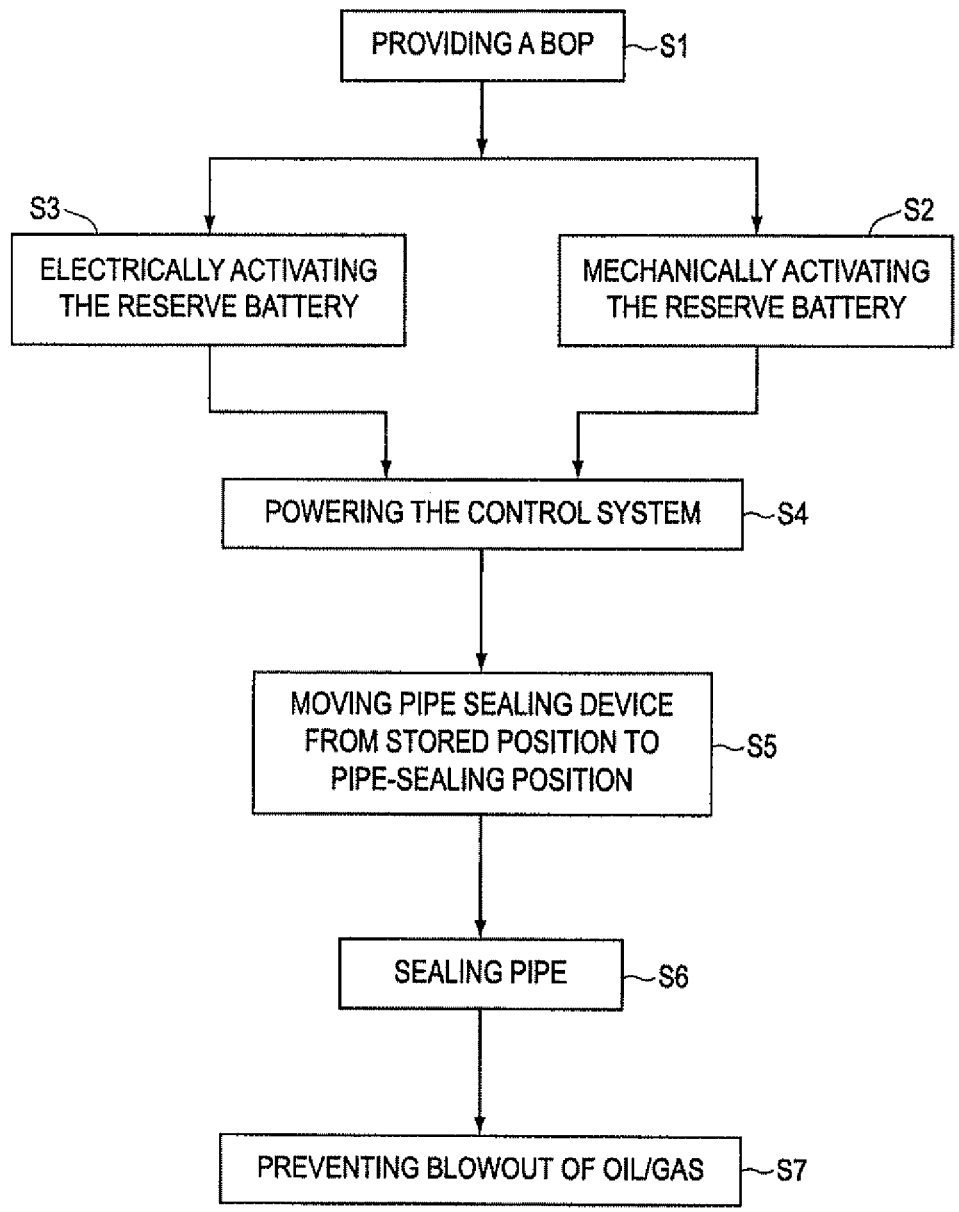
FIG. 10 is a flowchart of an exemplary embodiment of the invention illustrating a method of preventing a blowout of oil/gas on an oil/gas rig.

FIG. 10 is a flowchart illustrating a method of preventing a blowout of oil/gas on an oil/gas rig in an emergency situation in accordance with an exemplary embodiment of the invention. This method includes first providing a blowout preventer 2, 3, 9 (S1), as discussed above. Next, the reserve battery 13 connected (either detachably or permanently) to the control system 12 is either electrically (S3) or mechanically (S2) activated to power the control system 12 (S4). The powered control system 12 can then control the actuator 11 to move the pipe sealing device 7 from a stored position to a pipe sealing position (S5). In the pipe sealing position, the pipe 6 is sealed (S6) by the blowout preventers 2, 3, 9, as discussed above. The sealing of the pipe 6 prevents the blowout of oil/gas from the oil/gas rig (S7).

As illustrated in the below table, typical subsea battery requirements are:

| Capacity (amp-hrs) | 20 Amps | 40 Amps | 60 Amps |
|---|---|---|---|
| 30 sec. | 0.17 | 0.33 | 0.5 |
| 60 sec. | 0.33 | 0.67 | 1.00 |
| 90 sec. | 0.50 | 1.00 | 1.50 |

These requirements help determine what type of reserve battery (e.g., a thermal battery) is appropriate for a given subsea system.

Figure 11:
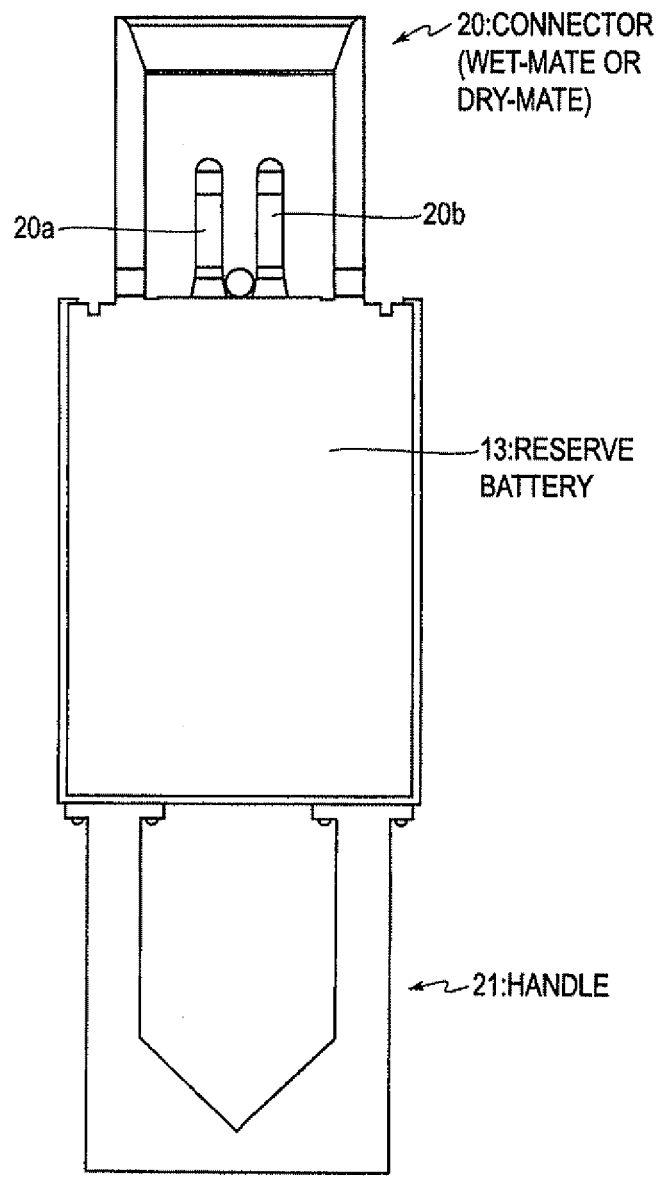
FIG. 11 is a top view, partially in section, of a replaceable reserve battery having a first connector and a handle that can be grasped by a remotely operated vehicle for use in subsea applications.

As illustrated in FIG. 11, a typical reserve battery 13 (for example, a thermal battery, as illustrated) preferably is modified in order to be adapted for optimal use in subsea systems. In particular, the battery is modified to include a container that can withstand high pressures, a handle 21 that can be grasped by a ROV and a male connector (coupling) 20, which can be a wet-mate connector or a dry-mate connector. Unlike the embodiment shown in FIGS. 6-8, the battery of the FIG. 11 embodiment is provided "in-line" with the connector 20 and the handle 21. As noted above, the blowout preventer (or other subsea application) would have a female connector (coupling) 28 that can electrically and physically join to the reserve battery connector 20. In FIG. 11, the connector 20 is a wet-mate connector which means that the connector portions (the two prongs 20a, 20b) will be exposed to sea water prior to connection to the mating coupling 28, which would typically be a dry-mate connector (having connector portions that are covered so as to remain dry).

Figure 13:
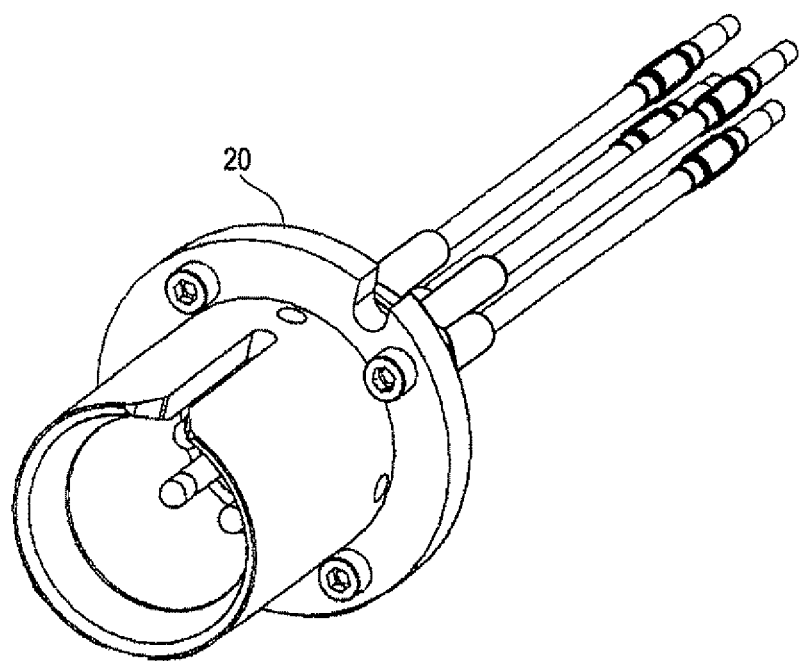
FIG. 13 is a perspective view of a connector that can be provided on the reserve battery (the reserve battery is not shown in FIG. 13)
Figure 14:
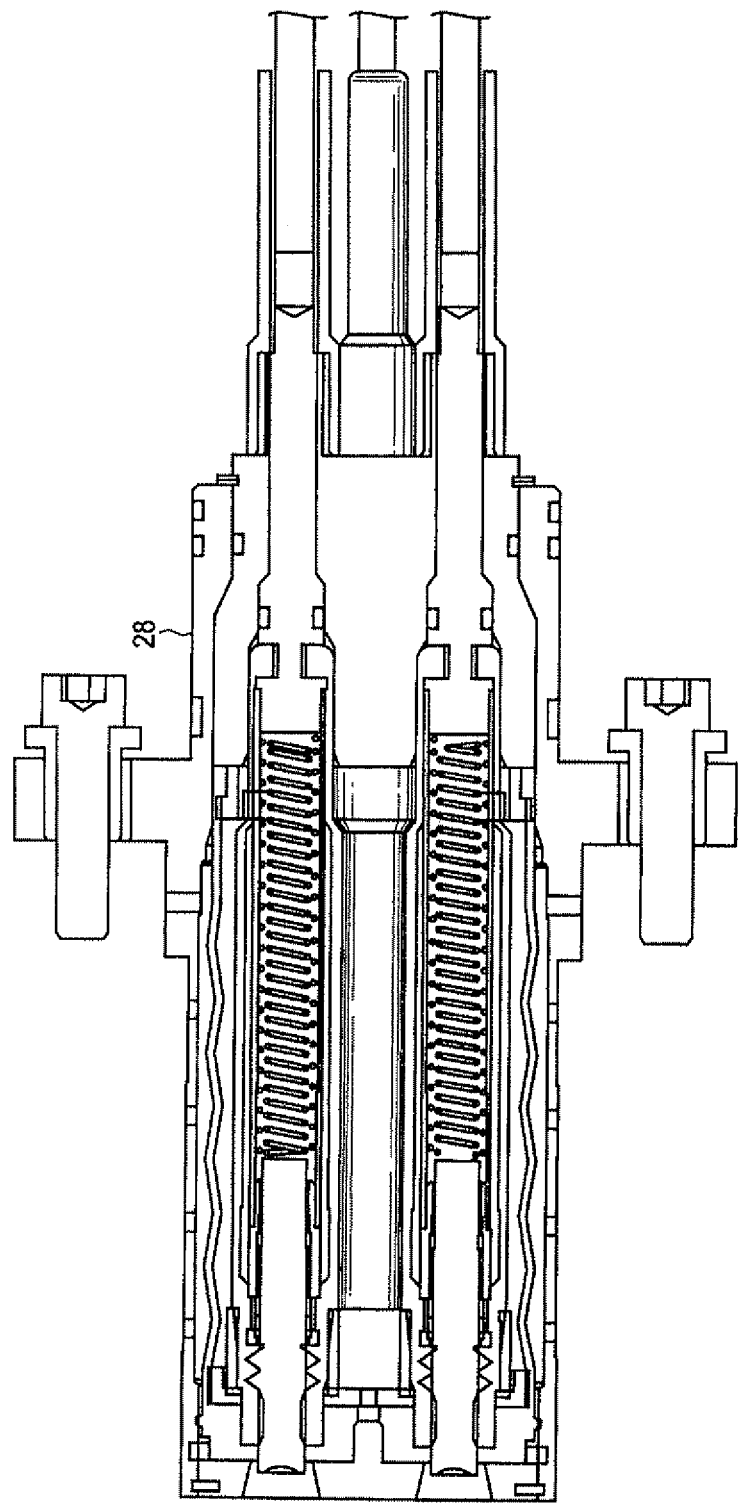
FIG. 14 is a side, sectional view of the subsea system connector (the subsea system is not shown in FIG. 14).

FIG. 12 provides a chart of the electrical and mechanical performance of the wet-mate 4-prong connector. Additionally, FIG. 13 is a perspective view of a wet-mate 4-prong connector that can be provided with the reserve battery for subsea systems (the reserve battery is not shown in FIG. 13). FIG. 14 is a side, sectional view illustrating the mating connector of the subsea system (the subsea system is not shown in FIG. 14). The connectors 20, 28 are available from Teledyne Oil & Gas, and have been used as electrical connectors (for example, between cables) in deep sea applications. The longitudinal slot shown in the external shroud on the left end of the FIG. 13 connector is used to align the connector 20 with the connector 28 (which will have a protrusion or detent that can extend into the slot). After alignment, the connector 20 will be moved toward connector 28. Within the shroud of the connector 20 are four electrical connectors (prongs), two of which are shown as 20a and 20b in FIG. 11. As the connector 20 moves toward the connector 28, the prongs engage spring-loaded receptacles to make an electrical connection between the signal lines associated with the prongs and the signal lines associated with the receptacles. In addition, sea water within the shroud escapes through the slot as the connector 20 is moved toward the connector 28.

The connector may further include a glass-to-metal compression seal on an inside surface. The seal exerts concentric compressive stress on glass. The seal is applied via a high temperature fusing process (i.e., greater than 1800° F.) in furnace PLC controlled, inert atmosphere. The seal allows for compression sealing between the conductor, glass and body of the connector. The use of this seal allows for optimization of the coefficient of thermal expansion and extremely stable final products. Further, the seal has extremely high durability, resistance to mechanical stress and strain, resistance to high shock and vibration (i.e. physical abuse), thermal shock stability and resistance, absolute hermeticity (i.e., zero diffusion/leakage), long-term stability (i.e., inorganic, non-ageing), and repeatable, tightly controlled process.

The illustrated exemplary embodiments of the apparatus and method for preventing a blowout of oil/gas on an oil/gas rig as set forth above are intended to be illustrative and not limiting. Various changes may be made without departing from the spirit and scope of the invention.

What is claimed is:

1. A subsea system comprising:
   an electrically powered control system for controlling the subsea system;
   a reserve battery electrically coupled to the control system to power the control system when the reserve battery is activated, the reserve battery remaining inert until activated;
   a container that houses the reserve battery, the container having a first coupling; and
   a second coupling, the first and second couplings being detachably connectable to each other and including electrical connections so that the reserve battery is replaceable while the subsea system remains below sea-surface.

2. The subsea system according to claim 1, wherein the subsea system is a blowout preventer for sealing a pipe.

3. The subsea system according to claim 2, wherein the blowout preventer includes:
   a housing including a bore therethrough for receiving the pipe;
   a pipe sealing device movable within the housing along a first direction toward a pipe-sealing position; and
   an actuator coupled to the pipe sealing device to move the pipe sealing device within the housing, wherein
   the control system controls the actuator to move the pipe sealing device from a stored position to the pipe-sealing position at which the pipe sealing device seals the pipe.

4. The subsea system according to claim 1, wherein the reserve battery is a lithium alloy/iron disulfide thermal battery.

5. The subsea system according to claim 1, wherein the reserve battery is a molten salt high temperature thermal battery.

6. The subsea system according to claim 1, wherein the reserve battery is a silver zinc battery.

7. The subsea system according to claim 1, wherein the reserve battery is a lithium/oxyhalide battery.

8. The subsea system according to claim 1, wherein the reserve battery includes an electrically-activated activator.

9. The subsea system according to claim 1, wherein the reserve battery includes a mechanically-activated activator.

10. The subsea system according to claim 9, wherein the mechanically-activated activator is a striker pin.

11. The subsea system according to claim 1, wherein the container is a high pressure, thick-walled container integral to the reserve battery.

12. The subsea system according to claim 1, wherein the electrical connections of the first and second couplings are water-proof, high-pressure resistant connectors.

13. The subsea system according to claim 1, further comprising:
   a primary battery electrically coupled to the control system,
   wherein the reserve battery is a backup battery connected to the primary battery such that the reserve battery is only utilized when the primary battery is not able to support power requirements.

14. The subsea system according to claim 1, wherein the subsea system is at least one of a point of load electrical power distribution, a hybrid power system, and a critical system.

15. The subsea system according to claim 1, wherein the subsea system is disposed on a seafloor.

16. The subsea system according to claim 1, wherein the container of the reserve battery includes a handle configured to be grasped by a robotic gripper.

17. The subsea system according to claim 1, wherein the reserve battery includes active ingredients that remain segregated from each other until the reserve battery is activated.

18. A method of providing power to a subsea system having a control system for controlling the subsea system, the method comprising:
   replaceably electrically coupling a reserve battery to the subsea system so that the reserve battery powers the control system, the reserve battery remaining inert until activated, wherein the reserve battery is housed in a container having a first coupling, and the subsea system includes a second coupling; and
   detachably connecting the first and second couplings to each other and include electrical connections so that the reserve battery is replaceable while the subsea system remains below sea-surface.

19. The method according to claim 18, wherein the reserve battery includes active ingredients that remain segregated from each other until the reserve battery is activated.

* * * * *